US006602635B1

(12) United States Patent
Laitinen et al.

(10) Patent No.: US 6,602,635 B1
(45) Date of Patent: Aug. 5, 2003

(54) METHOD AND ARRANGEMENT FOR ANTICIPATING DISENGAGEMENT MOMENT OF BATTERY PACKAGE OF BATTERY-OPERATED ELECTRONIC DEVICE, AND BATTERY-OPERATED ELECTRONIC DEVICE

(75) Inventors: Timo Laitinen, Viiala (FI); Merja Laine, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 21 days.

(21) Appl. No.: 09/652,337

(22) Filed: Aug. 31, 2000

(30) Foreign Application Priority Data

Sep. 1, 1999 (FI) .................................................. 991860

(51) Int. Cl.⁷ ............................. H01M 2/06; H01M 2/34
(52) U.S. Cl. ............................. 429/123; 429/97; 429/98
(58) Field of Search .......................... 429/1, 9, 96–100, 429/123

(56) References Cited

U.S. PATENT DOCUMENTS 5,248,570 A    9/1993  Meier ........................ 429/121
5,293,109 A *  3/1994  Fischl et al. ................. 429/97
5,294,496 A    3/1994  Sato ............................ 429/65
5,578,391 A * 11/1996  Meyers et al. .............. 429/123
5,733,673 A *  3/1998  Kunert ........................ 429/1
5,868,794 A *  2/1999  Barkley et al. .............. 607/29
6,141,223 A * 10/2000  Fukushima ................. 429/97

FOREIGN PATENT DOCUMENTS

WO       WO 97/12414        4/1997

* cited by examiner

Primary Examiner—Carol Chaney
(74) Attorney, Agent, or Firm—Perman & Green, LLP (57) ABSTRACT

A method and an arrangement for anticipating a disengagement moment of a battery package of a battery-operated electric device, and a battery-operated electric device. First identification members (9) of the disengagement moment of the battery package are arranged in a latch (3) of the battery package such that when the latch (3) is moved in order to disengage the battery package, warning information is generated from a housing of the device on the battery package being about to disengage from the housing of the device. In a preferred embodiment, the first identification members (9) are integrated into a spring element (7) of the latch (3). In another preferred embodiment, at least part of the latch (3) is made of an electrically conductive material and the first identification members (9) are integrated into the electrically conductive part of the latch (3).

25 Claims, 4 Drawing Sheets

METHOD AND ARRANGEMENT FOR ANTICIPATING DISENGAGEMENT MOMENT OF BATTERY PACKAGE OF BATTERY-OPERATED ELECTRONIC DEVICE, AND BATTERY-OPERATED ELECTRONIC DEVICE

BACKGROUND OF THE INVENTION

1. Field of the Invention

The invention relates to a method of anticipating a disengagement moment of a battery package of a battery-operated electronic device, in which method warning information is generated on disengagement of the battery package before electric connectors interconnecting the battery package and a housing of the device become detached from each other, and which warning information is generated by moving first.identification members of the disengagement moment of the battery package from a first position to a second position with respect to second identification members of the disengagement moment of the battery package.

The invention further relates to an arrangement for anticipating a disengagement moment of a battery package of a battery-operated electric device, which arrangement comprises first identification members of the disengagement moment of the battery package and second identification members of the disengagement moment of the battery package, the first identification members being arranged to be moved with respect to the second identification members between a first position and a second position such that when the first identification members are in the second position, warning information is arranged to be generated on the disengagement of the battery before electric connectors interconnecting the battery package and a housing of the device become detached from each other.

The invention still further relates to a battery-operated electric device which comprises a housing of the device and a battery package to be detachably arranged in the housing, the device further comprising first identification members of the disengagement moment of the battery package and second identification members of the disengagement moment of the battery package, the first identification members being arranged to be moved with respect to the second identification members between a first position and a second position such that when the first identification members are in their second position, warning information is arranged to be generated on the disengagement of the battery before electric connectors interconnecting the battery package and the housing of the device become detached from each other.

2. Description of Prior Developments

Batteries operating as a source of electrical power of battery-operated electronic devices, such as mobile phones, PDA (Personal Digital Assistant) devices, portable computers or the like, are usually arranged in a battery package, which, in turn, is attached to the housing of the device such that the battery package can be disengaged from the device manually, without using any tools. The battery package is locked to the housing by a clasp or a latch which is appropriately moved to unlock the locking between the device and the battery. It is to be noted in this connection that hereinafter, battery-operated devices are called a device.

A user of the device may, inadvertently or deliberately, detach the battery package without first turning off the device. In such a case, in order for the functions that are being carried out in the device to be finished in a controlled manner before the power is disconnected, the device has to receive warning information about the battery package becoming disengaged before the device becomes physically disengaged from the electric connector. The warning information has to be received at least 5 ms before the disengagement so as to enable a controlled shutdown to take place.

A known solution for anticipating the disengagement of the battery package is to arrange the battery package to be disengaged from the housing of a device with a sliding motion, the housing comprising, for example, spring-loaded identification members and corresponding metal contacts in the battery that follow the surface thereof. The metal contacts of the battery are of two different lengths, and when the battery package is being disengaged, the shorter contacts lose their contact with the identification members of the device earlier than the longer electric connectors, in which case the device receives an advance warning of the disengagement of the battery, being thus able to carry out a controlled shutdown.

In another known solution, the battery package is openably detachable, and protruding contact members of two different lengths are arranged in the housing of the device or the battery package. When the battery package is lifted off, the shorter contact members lose their contact earlier than the electric connectors, an advance warning of the battery becoming detached from the device being thus produced.

WO-97/12414 discloses an application of this wherein a mechanical disengagement switch of the battery controls an electric switch used for electrically disconnecting the battery cells from the contact members arranged on the surface of the battery package; consequently, the short-circuit protection is improved if, for example, the battery is kept in a pocket among metal objects.

In each above-described solution, special connectors or special contact members, or entirely separate switches, that cause additional component and assembly costs have been arranged in the battery package or the housing of the device. However, when said solutions are applied, a warning of the disengagement of the battery is often received too late, so there is not always time for a controlled shutdown.

A solution is also known wherein no warning of the disengagement of the battery is given in advance but large capacitors are arranged in the device whose charge is used for carrying out the shutdown. A disadvantage of the solution is the space-consuming additional capacitors which add to the weight of the device and increase component costs.

SUMMARY OF THE INVENTION

An object of the invention is to provide a method and an arrangement for anticipating a disengagement moment of a battery package to avoid the above-mentioned drawbacks.

A method of the invention is characterized in that the first identification members of the disengagement moment of the battery package are arranged in a latch of the battery package such that when the latch is moved in order to disengage the battery package from the housing of the device, the first identification members of the disengagement moment of the battery package are moved, said warning information being thus achieved.

An arrangement of the invention is characterized in that the first identification members of the disengagement moment of the battery package are arranged in connection with a latch of the battery package such that when the latch is moved, the first identification members of the disengagement moment of the battery package move with respect to the second identification members of the battery package.

An electric device of the invention is characterized in that the first identification members of the disengagement moment of the battery package are arranged in connection with a latch of the battery package such that when the latch is moved, the first identification members of the disengagement moment of the battery package move with respect to the second identification members of the battery package, said warning information being thus achieved.

The idea underlying the invention is that the warning information on the disengagement moment of the battery package is generated by the first identification members of the disengagement moment of the battery package, the first identification members being integrated in the latch of the battery package, and by the second identification members of the disengagement moment of the battery package such that a motion to open the latch activated by a user in order to disengage the battery package from the housing of the device moves the first identification members of the disengagement moment of the battery package with respect to the second identification members of the disengagement moment of the battery package from the first position to the second position, thus causing the warning information to be generated as early as possible. Furthermore, the idea underlying a first preferred embodiment is that when the first identification members of the disengagement moment of the battery package are moved from their first position to the second position, they come into an electric contact with the second identification members of the disengagement moment of the battery package, whereby the warning information on the disengagement of the battery is caused by said electric contact. Furthermore, the idea underlying a second preferred embodiment is that the first identification members of the disengagement moment of the battery package are integrated in the spring element of the latch, a motion and/or deformation of the spring element when the latch is moved causing the warning information on the disengagement of the battery. Furthermore, the idea underlying a third preferred embodiment is that at least part of the latch of the battery package comprises an electrically conductive material, the first identification members of the disengagement moment of the battery package being integrated into said electrically conductive part.

An advantage of the invention is that the warning of the disengagement of the battery package is produced as early as possible, i.e. immediately when the user moves the latch of the battery package to disengage the battery package. The arrangement of the invention is cost-efficient, mechanically durable, space-saving and reliable in use since it does not comprise any separate mechanical components. Neither does the arrangement comprise any large capacitors or similar space-consuming electric components that would cause component and assembly costs. In addition, the spring element can be mechanically assembled, so it is inexpensive to install.

BRIEF DESCRIPTION OF THE DRAWINGS

The invention will be described in closer detail in the accompanying drawings, in which.

DESCRIPTION OF THE PREFERRED EMBODIMENTS

Figure 1:
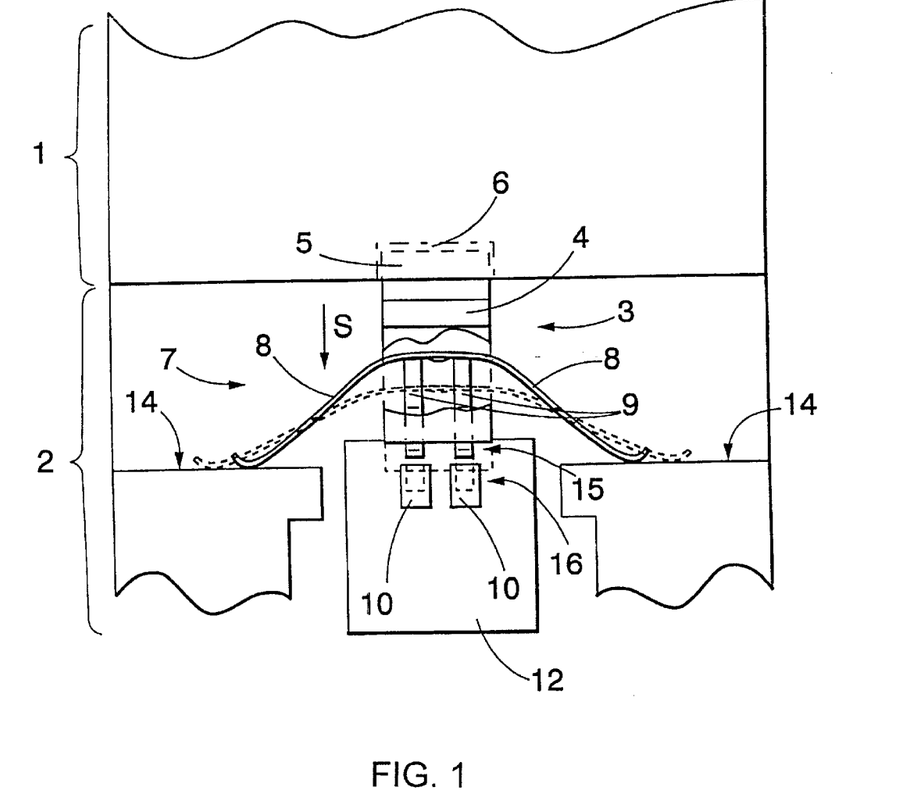
FIG. 1 is a schematic, partly sectional top view of an embodiment of an arrangement of the invention.

FIG. 1 is a schematic, partly sectional top view of an embodiment of an arrangement of the invention. A first part 1 and a second part 2 of a device are arranged and locked together by a latch 3 in a manner known per se. In the present embodiment, the first part 1 of the device is the housing of the device, in which case the second part 2 of the device is the battery package of the device. A reverse arrangement is, of course, also possible wherein the first part 1 of the device is the battery package of the device and the second part 2 is the housing of the device. The latch 3 is shaped to enable ease of use; it is, for example, roughened or serrated, or, as in the embodiment shown by the figure, provided with a grip part 4 whereof a user of the device obtains an easy and reliable grip in order to use the latch 3. The latch 3 further comprises a tongue 5 which, forced by a spring element 7, is locked to a recess-like counter-part 6 of the tongue in the first part 1 of the device, and which simultaneously locks the first part 1 and the second part 2 of the device together. In FIG. 1, the tongue 5 is denoted by a broken line and the counter-part 6 of the tongue by a dotted broken line. The latch 3 is preferably manufactured from a plastic material. The spring element 7 is substantially immovably attached to the latch 3. The spring element 7 and the latch 3 can be attached mechanically by glueing or using another method known per se. The spring element 7, in turn, is manufactured from a suitably resilient material, typically from metal or alloy of metals. The spring element 7 comprises four branch-like protruding parts, a first and a second branch thereof being arranged as return springs 8, and a third and a fourth branch being arranged as first identification members 9 of a disengagement moment of the battery package. In FIG. 1, an unbroken line denotes a position of the return springs 8 of the sprig element 7 in the direction of which the spring force of the return springs 8 affects, a corresponding first position 15 of the first identification members 9 of the disengagement moment of the battery package, and, further, a corresponding position of the latch 3. In this position, the element 7 forces the tongue 5 of the latch 3 into the counter-part 6 in the first part 1 of the device, whereby the first part 1 and the second part 2 of the device are locked together, and the first identification members 9 of the battery package are in their first position 15 with respect to second identification members 10 of the battery package, in which first position 15 the first identification members 9 of the battery package do not come into contact with the second identification members 10 of the battery package. In the embodiment shown in the figure, the second identification members 10 are placed on a circuit board 12, but also other placement solutions known per se to one skilled in art are feasible.

When the user of the device wants to detach the battery package from the housing of the device, he or she first moves the latch 3 in the direction indicated by arrow S in order to release the tongue 5 from the counter-part 6. Consequently, the return springs 8 of the spring element 7 yield in direction S and the free ends of the return spring 8 slide away from each other on a counter-surface 14 and the first identification members 9 of the battery package slide to a second position 16 such that they come into contact with the second identification members 10. The second position 16 of the first identification members 9 and the corresponding position of the latch 3 and the spring element 7 are shown in the figure by a densely-dashed broken line. The contact between the first and the second identification members 9, 10 generates information on the basis of which the device receives an advance warning of the disengagement of the battery and starts to shut down ongoing functions in the device. If the generation of the warning information is based on the establishment of an electric contact between the second identification members of the disengagement moment of the battery, at least the first identification members 9 of the disengagement moment of the battery must naturally be made of an electrically conductive material. The rest of the spring element 7 may be made of a substantially electrically non-conductive material. Hence, the process of shutting down the functions is provided with as much time as possible since the warning of the disengagement of the battery is produced immediately in connection with a first action to-be carried out to disengage the battery. Other locking devices than the latch 3 can, of course, be arranged between the housing of the device and the battery package in a manner known per se, but the only way to detach the battery package from the housing is to move the latch 3 from its first position to the second position.

Figure 2A:
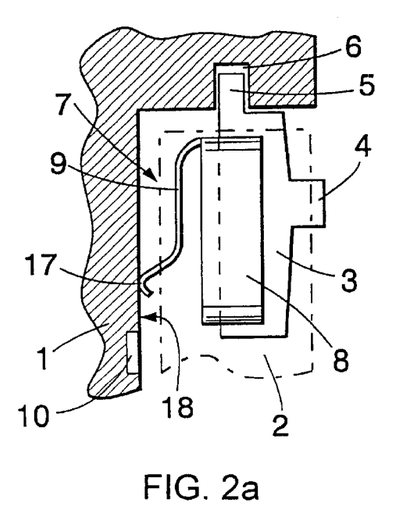
FIG. 2a is a schematic, partly sectional side view of an embodiment of a latch of the battery package according to FIG. 1, FIG. 2b a schematic, partly sectional view of an embodiment of the latch of the battery package according to FIG. 1, as shown in the direction of first identification members of a disengagement moment of the battery package.
Figure 2B:
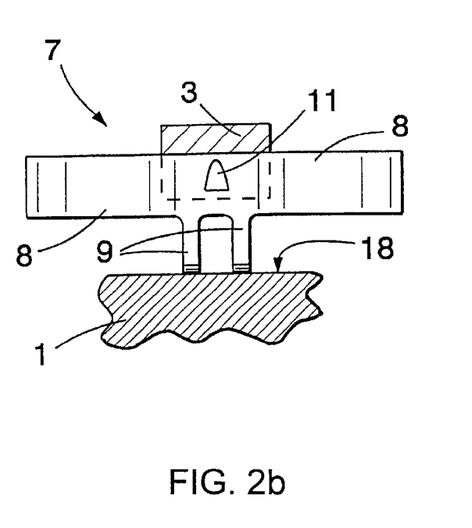

FIG. 2a is a schematic side view of an embodiment of the latch of the battery shown in FIG. 1, and FIG. 2b is a partly sectional view of the same embodiment of the latch as shown in the direction of the first identification members 9. In FIG. 2a, the second part 2 of the device, i.e. the battery package in the present embodiment, in which the latch 3 is arranged, is denoted by a broken line; for the sake of clarity, FIG. 2b lacks the second part 2. In order to make the latch 3 easier to handle, it is provided with the grip part 4 such that the user of the device is provided with a reliable grip with his or her finger to change the position of the latch 3. The tongue 5 formed in the latch 3 matches the counter-part 6 provided in the first part 1 of the device. The shape of the tongue 5 and the counter-part 6 thereof may naturally be another shape known per se than that shown in FIG. 2a. The spring element 7, which comprises the return springs 8 of the latch 3 and the first identification members 9 of the disengagement moment of the battery, is substantially immovably arranged in the latch 3. In the embodiment shown in FIGS. 1, 2a and 2b, the latch 3 and the spring element 7 are attached to each other such that a protruding part 11 provided in the spring element 7 is arranged in a close-fit attachment groove formed in the latch 3, whereby said protruding part 11 penetrates into the material of the latch 3 and attaches the spring 7 substantially immovably to the latch 3. Ends 17 of the first identification members 9 of the disengagement moment of the battery lean against a sliding surface 18. When the latch 3 is moved from the first position shown in FIG. 2a to the second position, the ends 17 of the first identification members 9 slide and come into contact with the second identification members 10 of the disengagement moment of the battery arranged in the first part 1 of the device, and the warning information of the disengagement of the battery is thus generated. The identification members 9, 10 of the disengagement moment of the battery are thus arranged in different parts of the device: the first identification members 9 are arranged in the second part 2 of the device, i.e. in the battery package of the device, and the second identification members 10 are arranged in the first part 1 of the device, i.e. in the housing of the device. From the second identification members 10, the information on the disengagement of the battery package can be readily transmitted to ongoing functions in the device.

Figure 3:
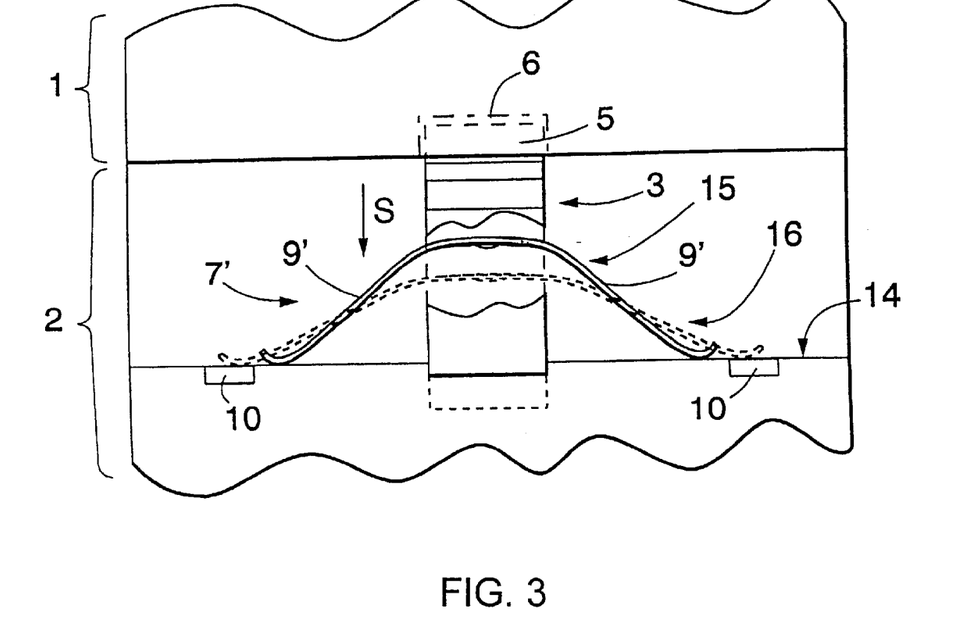
FIG. 3 is a schematic, partly sectional top view of an embodiment of a second arrangement of the invention.

FIG. 3 is a schematic, partly sectional top view of an embodiment of a second arrangement of the invention. In this embodiment, the first part 1 of the device is the battery package of the device and the second part 2 is the housing of the device. The latch 3 is arranged in the second part 2 of the device and it is similar in structure and operation to the one described in connection with the figures discussed above. A spring element 7' arranged in the latch 3 now comprises two branches that operate both as a return spring of the latch 3 and as first identification members 9' of the disengagement moment of the battery package. The second identification members 10 of the disengagement moment of the battery package are, in turn, arranged on the sliding surface 14 of the free ends of the spring element 7'. When the latch 3 is moved to disengage the battery from the housing of the device, the free ends of the spring element 7'—and, simultaneously, the first identification members 9' of the disengagement moment of the battery—slide outwards on the sliding surface 14, whereby they come into contact with the second identification members 10 of the disengagement moment of the battery and cause the warning information on the disengagement of the battery.

Figure 4:
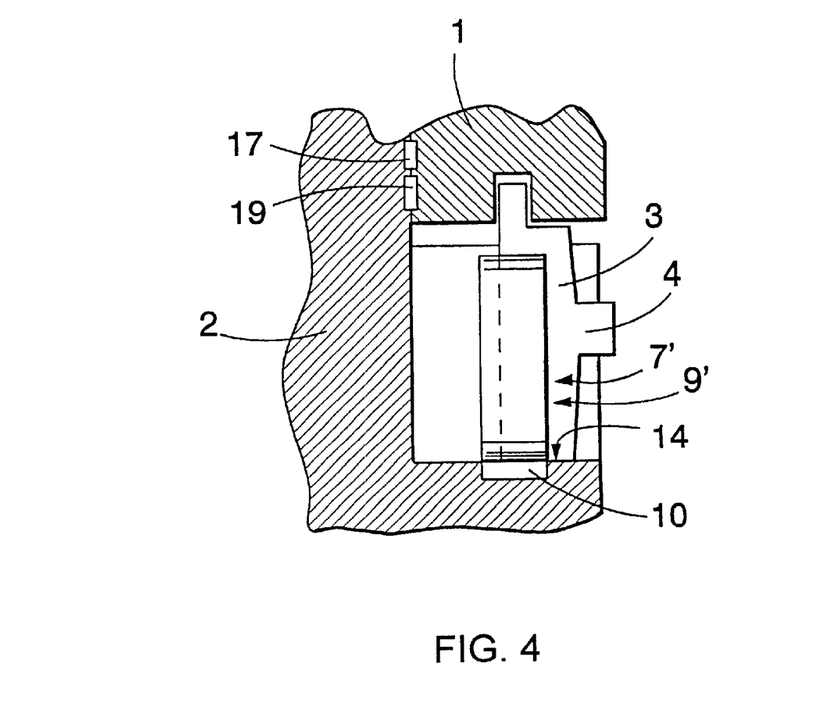
FIG. 4 is a schematic, partly sectional side view of an embodiment of a latch of the battery package according to FIG. 3.

FIG. 4 is a schematic, partly sectional side view of an embodiment of the latch of the battery according to FIG. 3. The latch 3 and the first identification members 9' of the disengagement moment of the battery attached thereto are arranged in the second part 2 of the device, as are the second identification members 10 of the disengagement moment of the battery. Since the second part 2 of the device is its housing, the information on the disengagement of the battery can be readily and simply transmitted from the identification members 9', 10 of the disengagement moment of the battery to the functions of the device in manners known per se to one skilled in the art. In an alternative embodiment wherein the second part 2 of the device is the battery package, the first part 1 then naturally being the housing of the device, the information on the disengagement of the battery package can be transmitted to the functions of the device by separate identification members arranged in the battery package which, however, are not shown in the figure for the sake of simplicity. In addition to the latch 3, the first part 1 and the second part 2 of the device are detachably attached to each other by one or more attachment members 17, which attachment member 17 can, for example, be a pin or a claw formed in the second part to be slid into the groove formed in the second part, or another corresponding attachment solution known per se. Naturally, the attachment member 17 can be located at any suitable point of the interface surface of the first part 1 and the second part 2 although it is placed extremely close to the latch 3 in the embodiment shown by the figure. The essential point is, however, that the first part 1 and the second part 2 of the device cannot be detached from each other without moving the latch 3. Electrical power from the battery package to the functions of the device is transmitted via electric connectors 19.

Figure 5:
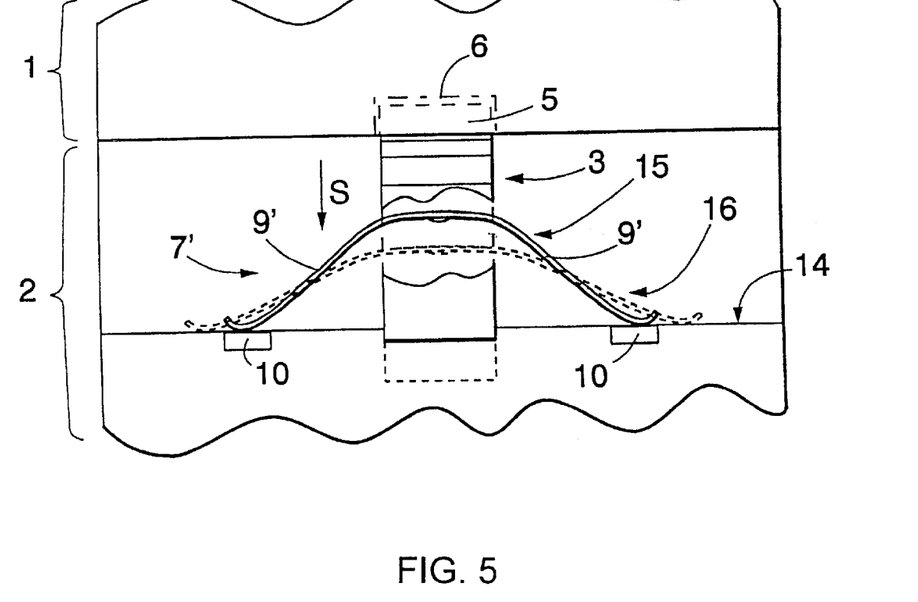
FIG. 5 is a schematic, partly sectional top view of a third embodiment of the latch of the battery package of the invention.

FIG. 5 is a schematic, partly sectional top view of a third embodiment of an arrangement of the invention. The embodiment of the invention shown in the figure is in its relevant parts similar to the embodiment shown in FIG. 3 and 4, but in their first position 15, the first identification members 9' of the disengagement moment of the battery come into contact with the second identification members 10 of the disengagement moment of the battery, and, correspondingly, in the second position 16, they do not come into contact with said second identification members 10. The warning information on the disengagement of the battery is thus generated when the contact between the first identification members 9' and the second identification members 10 of the disengagement moment of the battery is broken. Naturally, the same principle can also be applied in connection with the four-branched spring element 7 according to FIG. 1.

Figure 6:
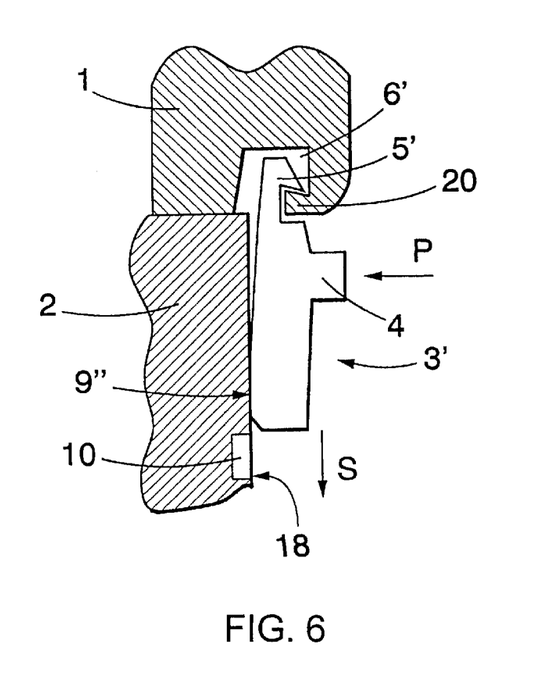
FIG. 6 is a schematic, partly sectional side view of a fourth embodiment of the latch of the battery package of the invention.

FIG. 6 is a schematic, partly sectional side view of a fourth embodiment of a latch of the battery package of the invention. A latch 3' arranged in the second part 2 of the device attaches, by means of its claw-shaped tongue 5', behind a protruding part 20 of a counter-part 6' arranged in the first part 1, thus interlocking said first and second parts. When the latch 3' is to be opened, it is first pressed in the direction indicated by arrow P, and next, the tongue 5' is released from the counter-part 6' by moving the latch 3', still being pressed down, in the direction indicated by arrow S from its first position 15 to its second-position 16.

The latch 3' is made of a material which is resistant to repeated bending, which materials property, combined with the shape of the latch 3', enables the locking to be implemented without a separate spring element. Alternatively, the attachment of the latch 3' to the second part 2 of the device is implemented resiliently. In addition, the material of the latch 3' is electrically conductive. The material can be plastic, metal or the like. The lower surface of the latch 3' sliding against the sliding surface 18 operates as first identification members 9" of the disengagement moment of the battery, and when the latch 3' is being opened, the lower surface of the latch 3' slides and comes into contact with the second identification members 10 of the disengagement moment of the battery package arranged on the sliding surface 18. Said contact of the identification members 9", 10 generates the information on the disengagement of the battery. Naturally, it is feasible that a separate spring element is used in connection with a latch made of an at least partly electrically conductive material.

Figure 7:
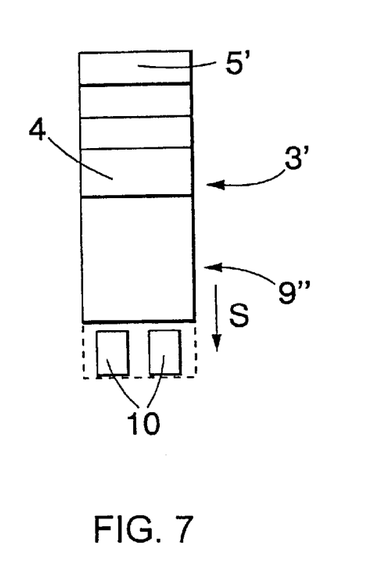
FIG. 7 is a schematic top view of an embodiment of the latch of the battery package according to FIG. 6.

FIG. 7 is a schematic top view of an embodiment of the latch of the battery package according to FIG. 6. An electric contact is established between the second identification members 10 of the disengagement moment of the battery package when the latch 3' slides over them. The second identification members 10 can be, for example, spring contacts, whereby the clearance between the latch 3' and the sliding surface 18 can be greater. The structure of the latch 3' can also be partially electrically conductive such that only the first identification members 9" of the disengagement moment of the battery package are made of an electrically conductive material.

Figure 8:
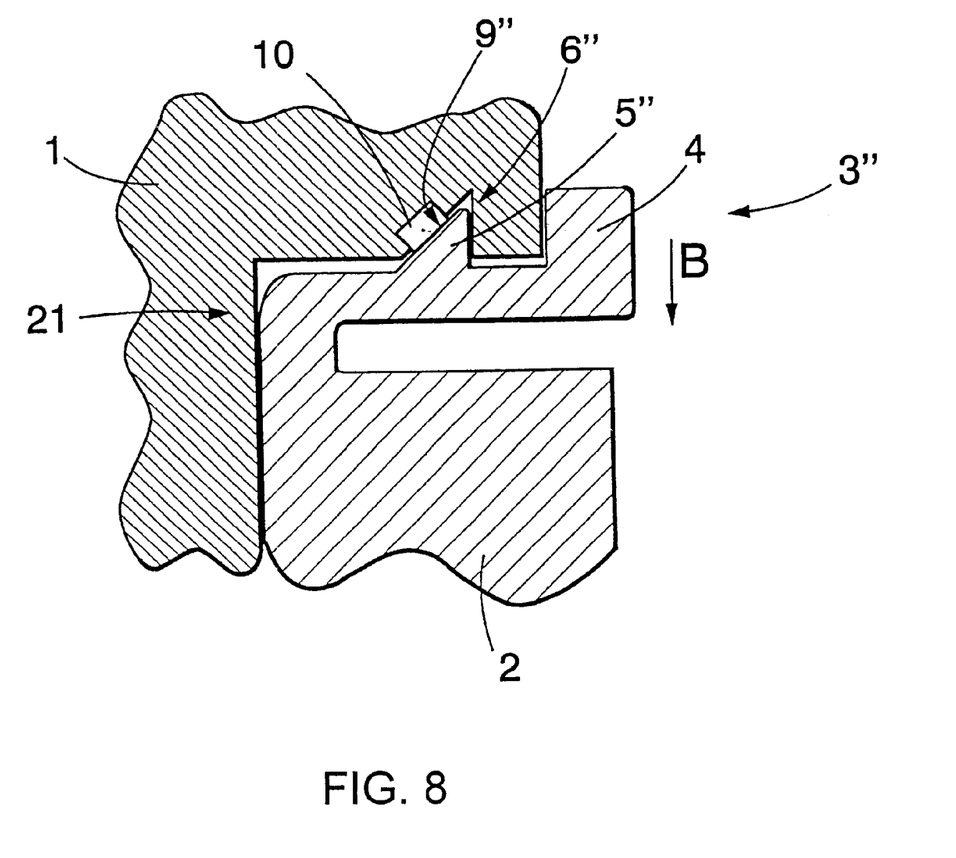
FIG. 8 is a schematic sectional side view of a fifth embodiment of the latch of the battery package of the invention.

FIG. 8 is a schematic sectional side view of a fifth embodiment of the latch of the battery package of the invention. A latch 3" of the battery package is made of a resilient plastic material, and the first identification members 9" of the disengagement moment of the battery package are arranged on the surface of a tongue 5" of the latch 3". The first identification members 9" of the disengagement moment of the battery package are manufactured by, for example, coating with a thin metal layer, attaching a metal layer onto the surface at issue in some other manner, mixing an electrically conductive filling material in the surface material, or manufacturing the identification members from electrically conductive plastic. The entire latch 3" can also be manufactured as an integrated component from a suitable, electrically conductive material. In an embodiment of the invention, the latch 3" is substantially entirely made of metal. The second identification members 10 of the disengagement moment of the battery package, in turn, are arranged in a counter-part 6" of the tongue 5" located in the first part 1 of the device such that when the tongue 5" is arranged in the counter-part 6", the first and the second identification members 9", 10 come into contact with each other. The second identification members 10 are preferably implemented as spring contacts.

The first part 1 and the second part 2 of the device are detached from each other by bending the latch 3" in the direction indicated by arrow B, whereby the latch 3" bends, particularly at its bending part 21, when the tongue 5" is released from its counter-part 6". At the same time, the contact between the first identification members 9" and the second identification members 10 of the disengagement moment of the battery arranged in the latch 3" is broken, the warning information on the disengagement of the battery package thus being generated.

The drawings and the related description are only intended to illustrate the idea of the invention. In its details, the invention can vary within the scope of the claims. Also other functions, such as identification contacts and/or temperature contacts of the battery, can be combined with the first identification members 9, 9', 9" and the second identification members 10.

What is claimed is:

1. A method of anticipating a disengagement moment of a battery package of a battery-operated electronic device, wherein warning information is generated on disengagement of the battery package before electronic connectors interconnecting the battery package and a housing of the device become detached from each other, and in which warning information is generated by moving first identification members of the disengagement moment of the battery package from a first position to a second position with respect to second identification members of the disengagement moment of the battery package, wherein the first identification members of the disengagement moment of the battery package are integral to a spring element of a latch of the battery package, whereby when the latch is moved in order to disengage the battery package from the housing of the device, the first identification members of the disengagement moment of the battery package are moved to the second position to provide the warning information.

2. A method as claimed in claim 1, whereby when said first identification members of said disengagement moment of said battery package are moved in their second position, they come into contact with said second identification members of said disengagement moment of said battery package.

3. A method as claimed in claim 1, wherein when said first identification members of said disengagement moment of said battery package are moved from their first position to said second position, they lose contact with said second identification members of said disengagement moment of said battery package.

4. A method as claimed in claim 1, wherein said latch comprises an electrically conductive material, and said first identification members of said disengagement moment of said battery package are integrated into an electrically conductive part of said latch.

5. A method as claimed in claim 1 wherein said latch is arranged in said battery package.

6. A method as claimed in claim 1, wherein said latch is arranged in said housing of said device.

7. A method as claimed in claim 1, wherein said device comprises a first part and a second part, one of the parts being said housing of said device and the other being said battery package of said device, and said first identification members of said disengagement moment of said battery package and said second identification members of said disengagement moment of said battery package are arranged in the same part of said device.

8. A method as claimed in claim 1, wherein said device comprises a first part and a second part, one of the parts being said housing of said device and said other being said battery package of said device, and said first identification members of said disengagement moment of said battery package and said second identification members of said disengagement moment of said battery package are arranged in different parts of said device.

9. An arrangement for anticipating a disengagement moment of a battery package of a battery-operated electric device, the arrangement comprising:
   first identification members of the disengagement moment of the battery package and second identification members of the disengagement moment of the battery package,
   the first identification members being arranged to be moved with respect to the second identification members between a first position and a second position,
   wherein when the first identification members are in the second position, warning information is adapted to be generated on the disengagement of the battery before electric connectors interconnecting the battery package and a housing of the device become detached from each other,
   wherein the first identification members of the disengagement moment of the battery package are integral to a spring element a latch of the battery package,
   wherein when the latch is moved, the first identification members of the disengagement moment of the battery package move with respect to the second identification members of the battery package.

10. An arrangement as claimed in claim 9, when in said second position, said first identification members of said disengagement moment of said battery package come into contact with said second identification members of said disengagement moment of said battery package.

11. An arrangement as claimed in claim 9, when in said first position, said first identification members of said disengagement moment of said battery package come into contact with said second identification members of said disengagement moment of said battery package.

12. An arrangement as claimed in claim 1, wherein said latch comprises an electrically conductive material, and said first identification members of said disengagement moment of said battery package are integrated into said electrically conductive part of said latch.

13. An arrangement as claimed in claim 9 wherein said spring element of said latch comprises substantially four branches, a first and a second branch thereof being arranged to operate as a return spring of said latch, and a third and a fourth branch being arranged to operate as said first identification members of said disengagement moment of said battery package.

14. An arrangement as claimed in claim 9 wherein said spring element comprises substantially two branches that are arranged to operate as a return spring of said latch and as said first identification members of said disengagement moment of said battery package.

15. An arrangement as claimed in claim 9, wherein said latch is arranged in said battery package of said device.

16. An arrangement as claimed in claim 9, wherein said latch is arranged in said housing of said device.

17. An arrangement as claimed in claim 9, wherein said first identification members and said second identification members of said disengagement moment of said battery package are integrated in identification and temperature contacts of said battery package.

18. An arrangement as claimed in claim 9, wherein said device comprises a first part and a second part, one of the parts being said housing of said device and the other being said battery package of said device, and further that said first identification members of said disengagement moment of said battery package and said second identification members of said disengagement moment of said battery package are arranged in the same part of said device.

19. An arrangement as claimed in claim 9, wherein said device comprises a first part and a second part, one of the parts being said housing of said device and the other being said battery package of said device, and further that said first identification members of said disengagement moment of said battery package and said second identificatioon members of said disengagement moment of said battery package are arranged in different parts of said device.

20. A battery-operated electric device comprising:
   a housing for the device and a battery package adapted to be detachably arranged in the housing,
   the device further comprising first identification members of a disengagement moment of the battery package and second identification members of the disengagement moment of the battery package, the first identification members being arranged to be moved with respect to the second identification members between a first position and a second position such that when the first identification members are in their second position, warning information is adapted to be generated on the disengagement of the battery before electric connectors interconnecting the battery package and the housing of the device become detached from each other,
   wherein the first identification members of the disengagement moment of the battery package integral to a spring element of a latch of the battery package such that when the latch is moved, the first identification members of the disengagement moment of the battery package move with respect to the second identification members of the battery package and provide the warning information.

21. A battery-operated electric device as claimed in claim 20, wherein said first identification members of said disengagement moment of said battery package and second identification members of said battery package are arranged in said housing of said device.

22. A battery-operated electric device as claimed in claim 20, wherein said first identification members of said disengagement moment of said battery package and said second identification members of said disengagement moment of said battery package are arranged in said battery package.

23. A battery-operated electric device as claimed in claim 20, wherein said first identification members of said disengagement moment of said battery package are arranged in said housing of said device and said second identification members of said disengagement moment of said battery package are arranged in said battery package.

24. A battery-operated electric device as claimed in claim 20, wherein said first identification members of said disengagement, moment of said battery package are arranged in said battery package and said second identification members of said disengagement moment of said battery package are arranged in said housing of said device.

25. The method of claim 1 wherein the first identification members comprise at least a portion of the spring element of the latch.

* * * * *